(12) United States Patent
Mears

(10) Patent No.: US 8,708,634 B2
(45) Date of Patent: Apr. 29, 2014

(54) VEHICLE CARRIER FOR MOTOR HOME

(76) Inventor: Walter B. Mears, Davie, FL (US)

( * ) Notice: Subject to any disclaimer, the term of this patent is extended or adjusted under 35 U.S.C. 154(b) by 0 days.

(21) Appl. No.: 13/525,534

(22) Filed: Jun. 18, 2012

(65) Prior Publication Data

US 2012/0321420 A1 Dec. 20, 2012

Related U.S. Application Data

(60) Provisional application No. 61/498,044, filed on Jun. 17, 2011.

(51) Int. Cl.
*B60P 9/00* (2006.01)
*B60P 1/04* (2006.01)

(52) U.S. Cl.
USPC ........... 414/462; 414/470; 414/545; 224/545; 298/18

(58) Field of Classification Search
USPC ......... 414/462–466, 469, 470, 477, 478, 545; 224/42.32, 502, 509, 545
See application file for complete search history.

(56) References Cited

U.S. PATENT DOCUMENTS

| | | | | |
|---|---|---|---|---|
| 3,072,275 A * | 1/1963 | Ralston | ........................ | 414/462 |
| 3,757,972 A | 9/1973 | Martin | | |
| 4,275,981 A * | 6/1981 | Bruhn | ........................ | 414/462 |
| 4,470,746 A * | 9/1984 | Delachapelle | ................ | 414/470 |
| 4,934,894 A | 6/1990 | White | | |
| 5,018,651 A | 5/1991 | Hull et al. | | |
| 5,238,358 A * | 8/1993 | Higgins et al. | ................ | 414/463 |
| 5,853,278 A | 12/1998 | Frantz | | |
| 5,899,655 A | 5/1999 | Miller et al. | | |
| 6,123,499 A * | 9/2000 | Thornton et al. | ............. | 414/477 |
| 6,139,247 A | 10/2000 | Wright | | |
| 6,364,597 B2 * | 4/2002 | Klinkenberg | ................. | 414/462 |
| 6,371,719 B1 | 4/2002 | Hildebrandt | | |
| 6,783,315 B1 | 8/2004 | Senechal | | |
| 6,884,018 B1 * | 4/2005 | Dugan et al. | .................. | 414/462 |
| 6,948,732 B2 | 9/2005 | Amacker | | |
| 7,083,373 B1 | 8/2006 | Boudreau | | |
| 7,527,282 B2 | 5/2009 | Gilbert | | |
| 7,785,058 B2 | 8/2010 | Ray | | |
| 7,811,045 B2 * | 10/2010 | Butta | ........................... | 414/462 |
| 7,841,821 B2 | 11/2010 | Miro et al. | | |
| 2002/0081182 A1 * | 6/2002 | Harris | ........................... | 414/477 |
| 2005/0013682 A1 | 1/2005 | Pedrini | | |
| 2008/0101900 A1 * | 5/2008 | Harber | .......................... | 414/470 |
| 2009/0123260 A1 * | 5/2009 | Howard-Leicester | ........ | 414/475 |
| 2009/0297314 A1 * | 12/2009 | Jaeger et al. | .................. | 414/563 |
| 2010/0135756 A1 | 6/2010 | Winter, IV | | |
| 2010/0266378 A1 * | 10/2010 | Verwys | .......................... | 414/537 |

* cited by examiner

*Primary Examiner* — Gregory W. Adams
*Assistant Examiner* — Lynn Schwenning
(74) *Attorney, Agent, or Firm* — Robert M. Schwartz

(57) ABSTRACT

A vehicle carrier assembly adapted to be mounted to the rear of a recreational vehicle which is designed to carry and transport a secondary vehicle. The carrier assembly includes a lift system which includes a pivoting subassembly combined with a deployable ramp. The ramp extends from the pivoted subassembly at an angle until it reaches the ground. The ramp extends from the pivoted subassembly in a direction perpendicular the longitudinal axis of the recreational vehicle. The secondary vehicle would then drive onto the angled ramp. The ramp is then retracted back to its first position, atop the pivoting subassembly. The pivoting subassembly is then pivoted back from its deployed angular position back to an original horizontal position. The secondary vehicle is secured to the vehicle carrier. The recreational vehicle is now ready to travel with an easily mountable and demountable secondary vehicle aboard.

5 Claims, 7 Drawing Sheets

SECTION A-A OF FIG.2A

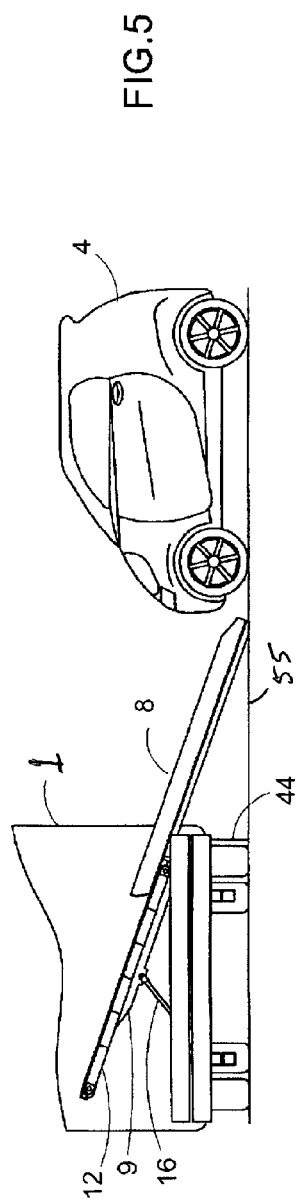
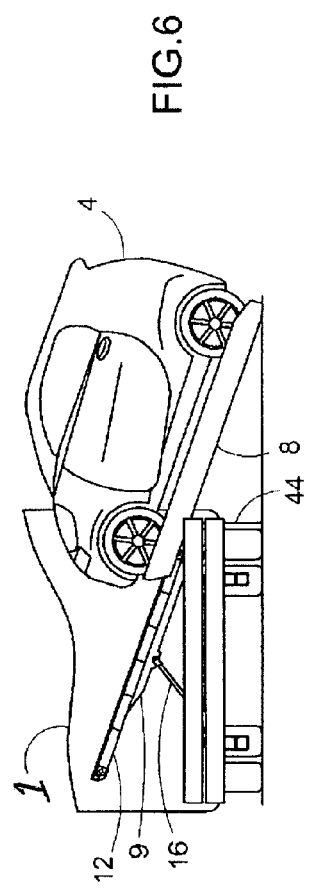
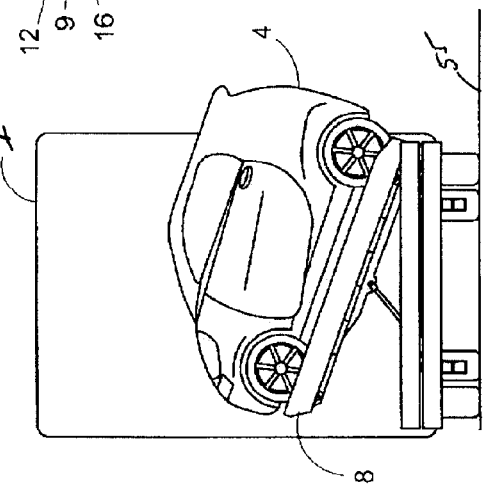
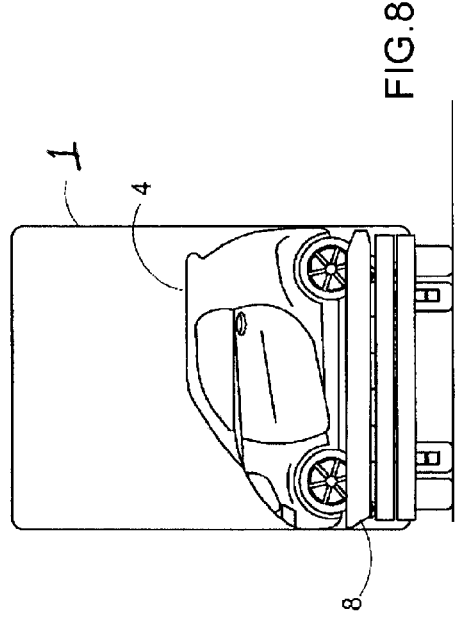

VEHICLE CARRIER FOR MOTOR HOME

RELATED APPLICATIONS

This application claims the benefit of U.S. Provisional Patent Application Ser. No. 61/498,044 filed Jun. 17, 2011, with the title of "Vehicle Carrier for Motor Home" the disclosure of which is incorporated herein by reference in its entirety.

BACKGROUND OF THE INVENTION

Recreational vehicles (also referred to herein as RV) have become a popular means to travel and to live in. One of the drawbacks of traveling or living in such a vehicle is the inconvenience of having to use the large RV vehicle for transportation means. Generally, recreational vehicles are large vehicles which are difficult to park. Additionally, such vehicles get poor gas mileage. As such the need has arisen to have a secondary vehicle which would accompany the primary recreational vehicle until the RV has reached a stopping place. At that point the secondary vehicle could be used for exploration, shopping, small trips or the like, leaving the RV at the stopping place, set up for use. There is a need to allow the secondary vehicle to be easily and safely mounted to the primary vehicle, to allow it to travel with the RV until it reaches its stopping point. There is a further need to allow easy, safe and quick loading and unloading of the secondary vehicle to the primary vehicle.

There have been attempts to solve this problem. Among them, and perhaps currently most popular is to provide the RV with a trailer hitch, hitch the secondary vehicle to the RV, deploy an interface between the RV and the secondary vehicle to permit brake lights, turn signals and back-up lights to be actuated on the secondary vehicle when those systems are engaged on the RV. In the vernacular of RV owners and users such a setup is known as a TOAD, perhaps a play on the word towed. There are some drawbacks to such a system, first, it extends the length of the primary RV vehicle by at least the length of the secondary vehicle, second, it is difficult, if not impossible, for the RV driver to see the towed vehicle, third, it reduces turning capabilities, and fourth there is no way to know if while traveling the brake light system interface may have come loose disabling the rear signaling system. The present system being described and claimed in this application obviates and reduces the drawbacks of towing a secondary vehicle and will be described below.

SUMMARY OF THE INVENTION

The present invention is directed to a vehicle carrier and lift system attached to the rear of a recreational vehicle, other large vehicle, bus, mobile home, motor coach or the like. The vehicle carrier and lift system is adapted to be secured to the rear of an RV vehicle. The vehicle carrier and lift system provides a powered, movable tilt bed, which supports a movable ramp which extends from the tilt bed to the ground. The ramp, when extended, is perpendicular to the longitudinal length of the RV. From the side, a secondary vehicle would be driven atop the deployed ramp. Then the ramp is retracted back atop the angularly disposed tilt bed, which is then tilted back to a horizontal position with the vehicle loaded aboard. At this point means to secure the vehicle to the ramp, such as tie downs are placed about the vehicle and blocks can be set against the wheels. Such securing means will need to be sufficient to secure the secondary vehicle to the car carrier while driving over highways and rough roads at the speed limit. The car carrier needs to be secured to the primary vehicle in such a manner to include a factor of safety so that it would be difficult to accidentally disengage or damage the secondary or primary vehicle. The secondary vehicle also needs to be secured to the car carrier in such a manner to include a factor of safety so that the secondary vehicle will remain affixed thereto until it is desired to unload the secondary vehicle.

The tilt assembly and deployable ramp may be actuated by hydraulic subsystems, pneumatic subsystems or electric motors. The tilt assembly has a dedicated subsystem for tilting the car bed rail from a horizontal position to its deployed position and back to its horizontal position. Atop the car bed rail is the slidable ramp which also has a dedicated subsystem for deploying the ramp to its extended position, and then returning the ramp to its non-deployed position.

The invention may have other applications. It may be used in long distance trucking. It additionally may have military applications, for instance, carrying an autonomously guided vehicle or small manned vehicle on the rear of a tracked or other military vehicle for rapid deployment. Such autonomous vehicles are currently used in bomb disposal and most certainly will be armed in the future to project power without exposing troops. Other vehicles may be carried as well, including all terrain vehicles, snowmobiles, motorcycles and the like. The car carrier may also carry any sort of material other than cars, as long as it meets the dimensions of the ramp, and possess the capability to be safely secured, for example pallets can be slid, pushed or rolled onto the ramp.

Other advantages, uses and more detailed explanation of the invention will become apparent from the following description taken in conjunction with the accompanying drawing figures, wherein it is set forth by way of illustration and example, the best mode and embodiment of the invention.

BRIEF DESCRIPTION OF THE DRAWINGS

FIG. 5 is a view of the carrier assembly mounted on the primary vehicle in its fully deployed state, with the secondary vehicle preparing to be loaded aboard;

FIG. 6 is a view of the carrier assembly mounted on the primary vehicle in its fully deployed state with the secondary vehicle having moved onto and secured atop the ramp;

FIG. 7 is a view of the carrier assembly mounted on the primary vehicle, with the ramp assembly in its retracted position;

FIG. 8 is a view of the carrier assembly mounted on the primary vehicle, with the secondary vehicle secured atop the ramp assembly, with the ramp retracted and pivoted to a horizontal position.

DETAILED DESCRIPTION OF THE INVENTION

Figure 1:
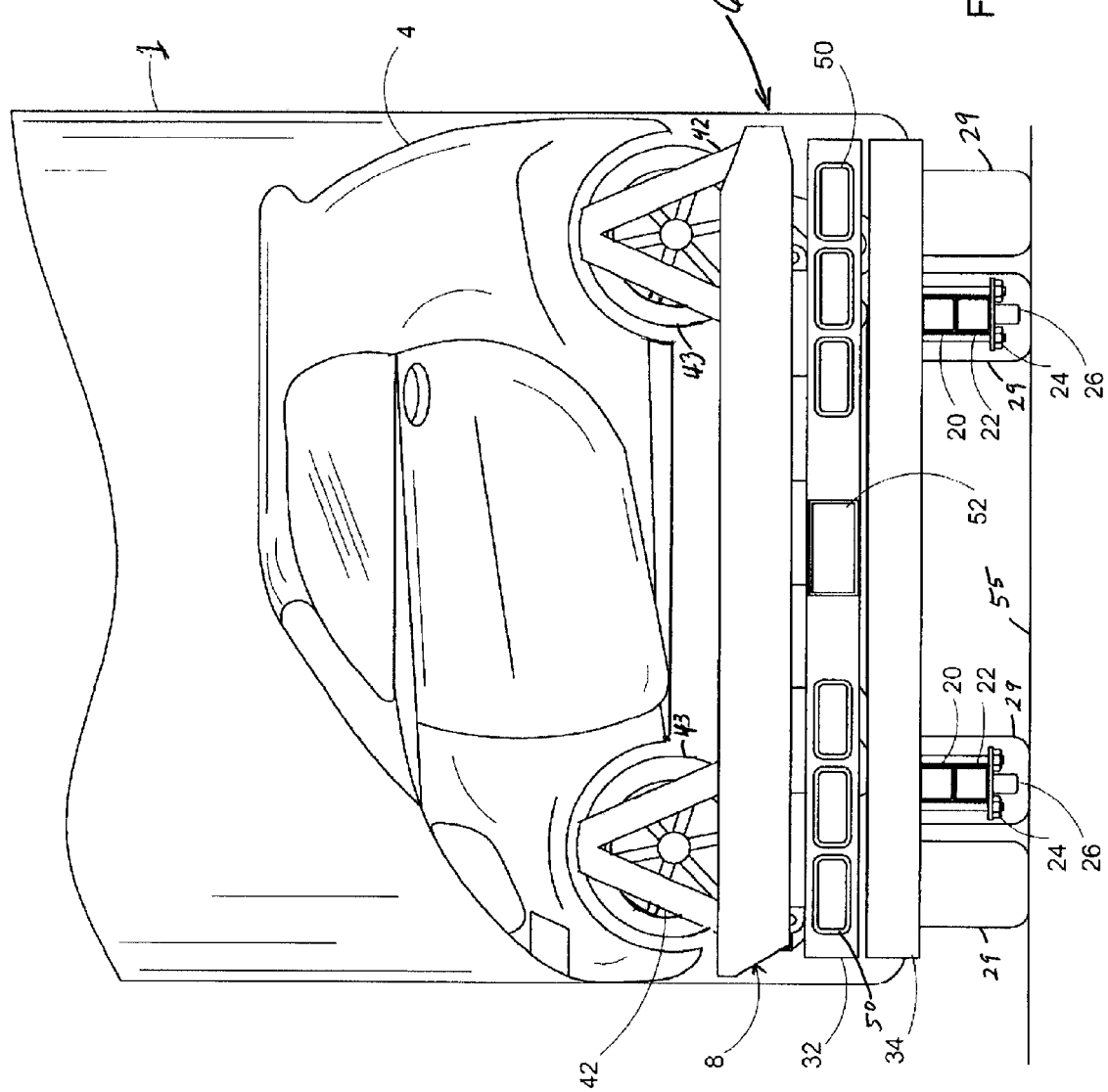
FIG. 1 shows an end view of the carrier assembly mounted on the primary vehicle, with the secondary vehicle being stowed on the car carrier.

Referring now to FIG. 1, a primary vehicle 1 is shown with the carrier assembly 6 mounted thereto. Loaded on the carrier assembly 6 is a secondary vehicle 4, in this example a 2011 Smart® car (SMART® is a United States registered trademark of and a product of Daimler AG Corporation Fed Rep Germany, Mercedesstrasse 137 Stuttgart Fed Rep Germany 70327). The secondary vehicle 4 is secured atop an extensible ramp assembly 8 with four securing tie downs 42, one for each wheel 43. The rear bumper 32 is attached to the rear of the carrier assembly 6. The rear bumper 32 is easily seen, as well as a plurality of tail lights 50 and a lighted license plate 52. Attached to the rear bumper 32 is a rear stone sweep 34. Both the rear bumper 32 and the rear stone sweep 34 may display indicia, have registration decals, bumper stickers, or the like affixed thereto. Primary vehicle 1 has rear tires 29 and is shown on a ground surface 55, where carrier assembly 6 is substantially parallel to ground 55. The carrier assembly 6 includes a pair of beam supports 20. The pair of first beam supports 20 are shown atop a pair of lower support brackets 22. The first beam supports 20 are attached to the lower support brackets 22 by a pair of mechanical fasteners 24. A skid wheel 26 is provided on the bottom of the lower support brackets 22 to protect the combined first support beams 20 and lower support brackets 22 from impacts with the road or ground. The first support beams 20 are affixed to the carrier assembly 6 and are best seen in FIG. 2B.

The primary vehicle 1 includes, but is not limited to, recreational vehicles, motor homes, motor coaches, trailers, trucks, military vehicles, both tracked and wheeled, large vans or the like. According to the manufacturer, one model of the Smart® car has a wheel base of 73.5 inches, a length of 106.1 inches and a width of 61.38 inches and weighs approximately 1808 lbs. The present invention is designed to at least support this vehicle. The primary vehicle 1 must have sufficient size and weight to be able to safely carry such a load at highway speeds. Any vehicle that meets these criterion may be considered to be a primary vehicle 1 for a version carrying a 2011 Smart® car. The carrier assembly 6, however, is not limited to solely carrying the aforementioned vehicle, or a vehicle at all. Although in one embodiment the carrier assembly 6 does carry a 2011 Smart® car, it could carry another vehicle or anything. Other cars that fit similar specifications in size and weight can be considered as a secondary vehicle 4. Further, the invention is not solely limited to carrying vehicles. Again, whatever the carrier assembly 6 is carrying, would limit the type of primary vehicle 1 which could be safely used.

Figure 2A:
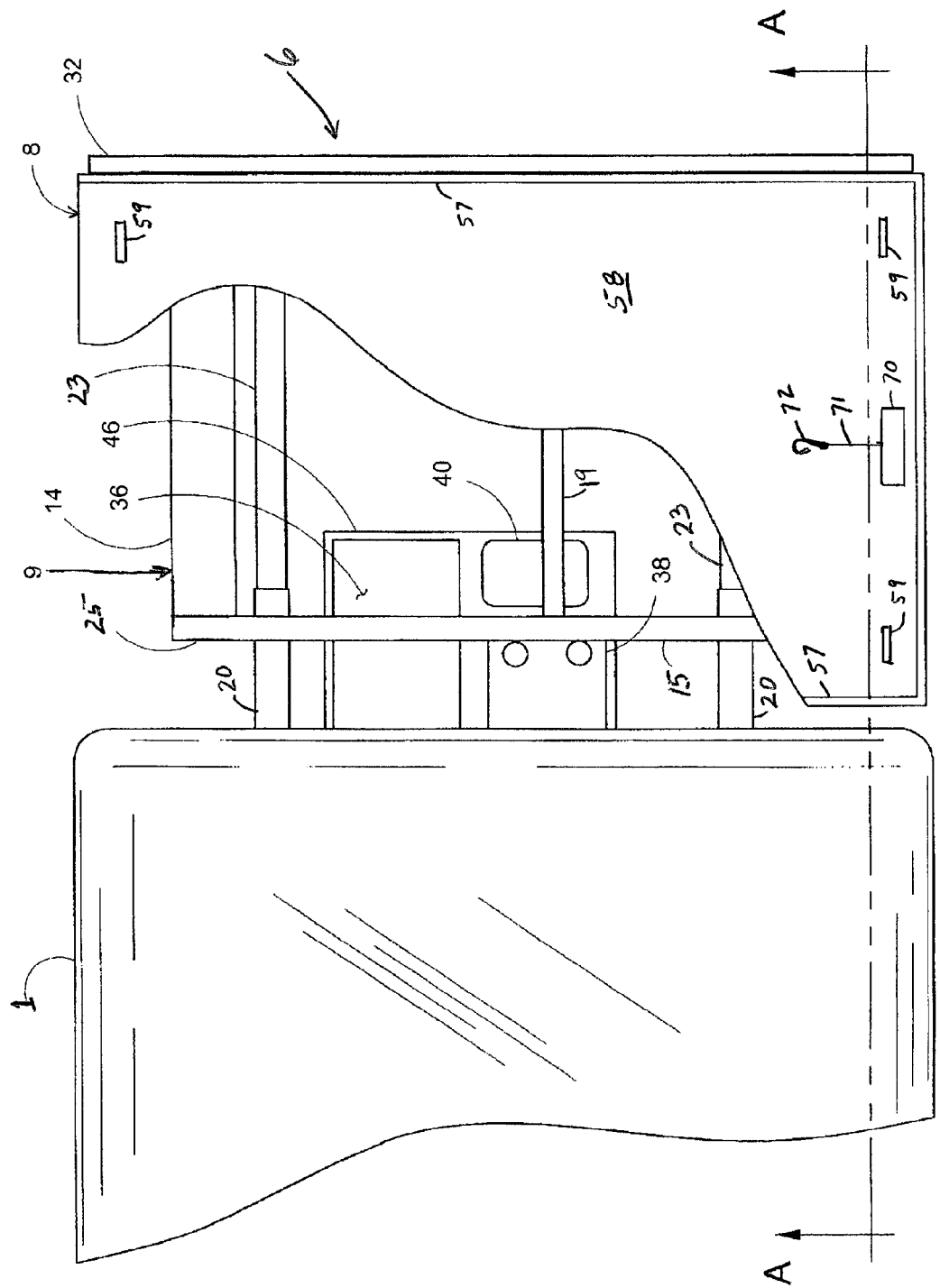
FIG. 2A is a partial cutaway view as seen from the top of the rear of the primary vehicle showing the carrier assembly mounted thereon, sans secondary vehicle.
Figure 2B:
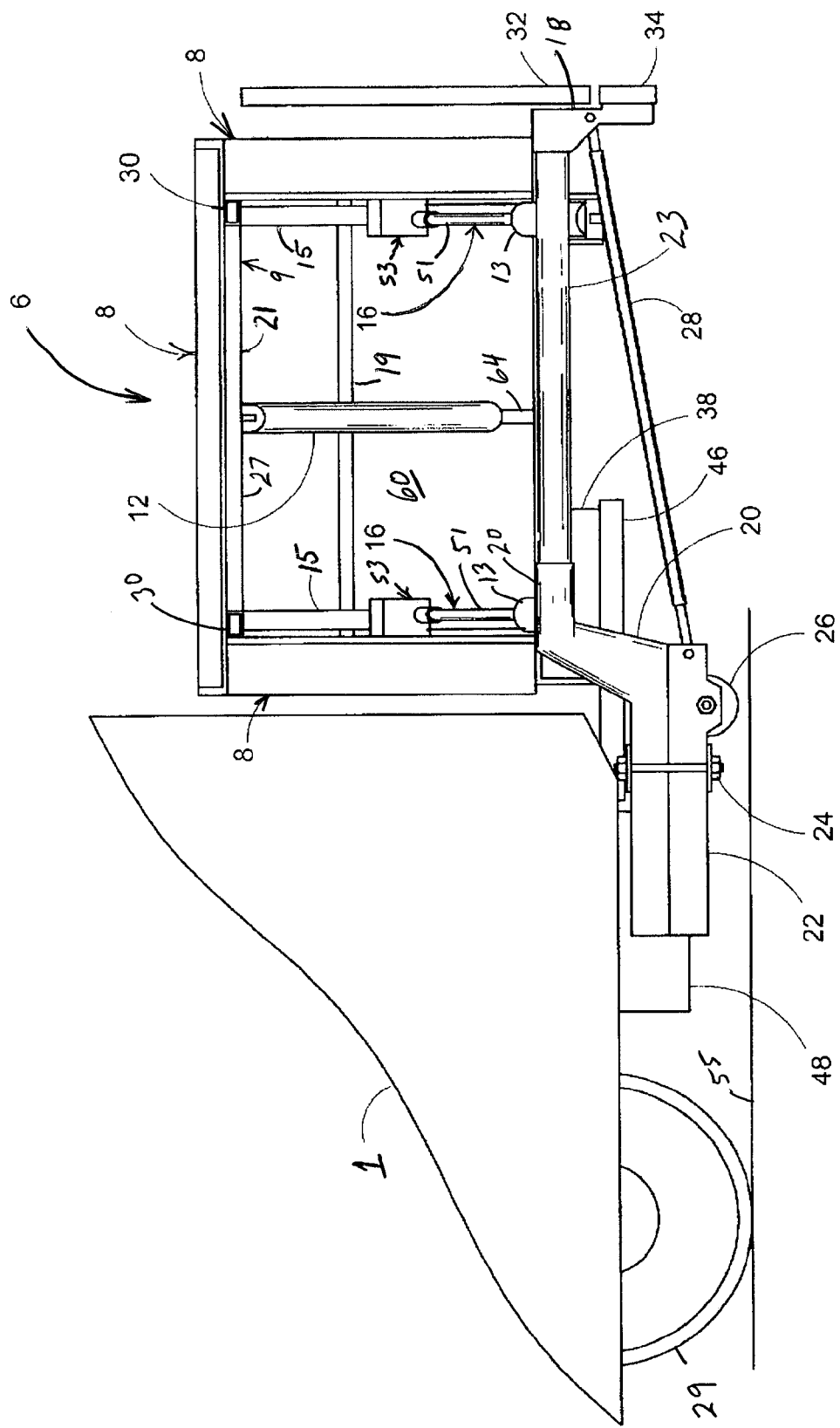
FIG. 2B is a side view of the carrier assembly attached to the primary vehicle in its pivoted position showing the rail assembly and the rail assembly pivoting means and the ramp assembly and the ramp assembly deployment and retraction means.

Referring now specifically to FIG. 2A, a partial view of the carrier assembly 6 is shown behind the primary vehicle 1. The carrier assembly 6 includes several components. Included among these components is the ramp assembly 8 and the rail assembly 9. The ramp assembly 8 has a cutaway view showing various components of the rail assembly 9. The rail assembly 9 includes a pair of parallel rails 15 of which only one can be seen in this FIG. 2A. The second parallel rail 15 can be seen more clearly in FIG. 2B. The pair of parallel rails 15 are connected on a first end 25 of the rail assembly 9 to a pivot 14. Two tubular beams 23 are shown in FIG. 2A. Each of the parallel rails 15 is adapted to have a wear plate 30 thereon. Wear plate 30 actually is the element that the portion of the ramp assembly 8 lies on and slides on. This prevents degradation of the parallel rails 15 and increases their life span. Rail assembly 9 has a cross beam 19 connecting parallel rails 15 at the approximate midpoint of their length and another cross beam 21 connecting parallel rails 15 at the second end 27. Ramp assembly 8 is constructed and arranged to slide along rail assembly 9. A winch 70 is provided on ramp assembly 8 with a cable 71 and a hook 72 or other attachment for pulling the secondary vehicle 4 onto ramp assembly 8. In the event the driver does not want to drive the secondary vehicle 4 onto the ramp 8 or the secondary vehicle 4 is not operable due to a dead battery or other mechanical issue, then the winch 70 can be used to pull the secondary vehicle 4 onto and up ramp 8. Preferably winch 70 would be electric and operate by remote control.

Figure 2C:
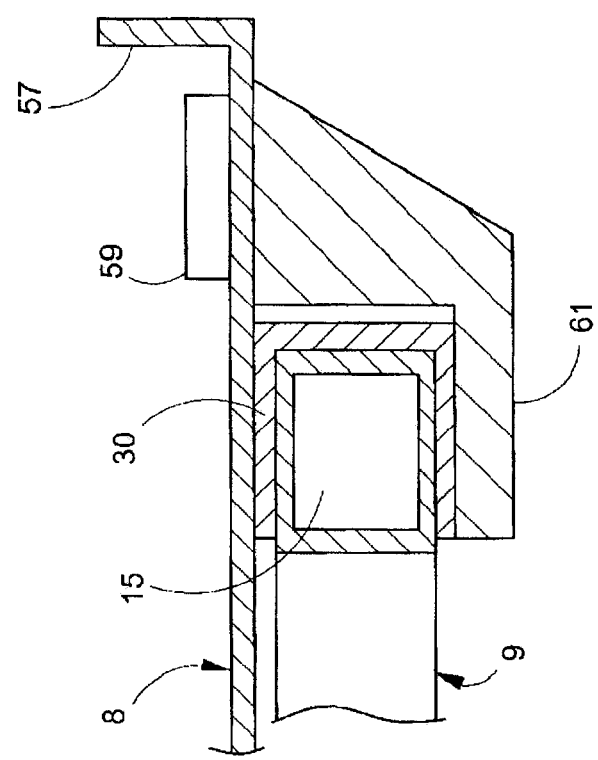
FIG. 2C is a sectional schematic view of ramp assembly 8 and rail assembly 9 taken generally along lines A-A from FIG. 2A to show the relationship of ramp assembly 8 and rail assembly 9. This view also shows the sides and chocks at the top portion of ramp assembly 8.
Figure 2C:
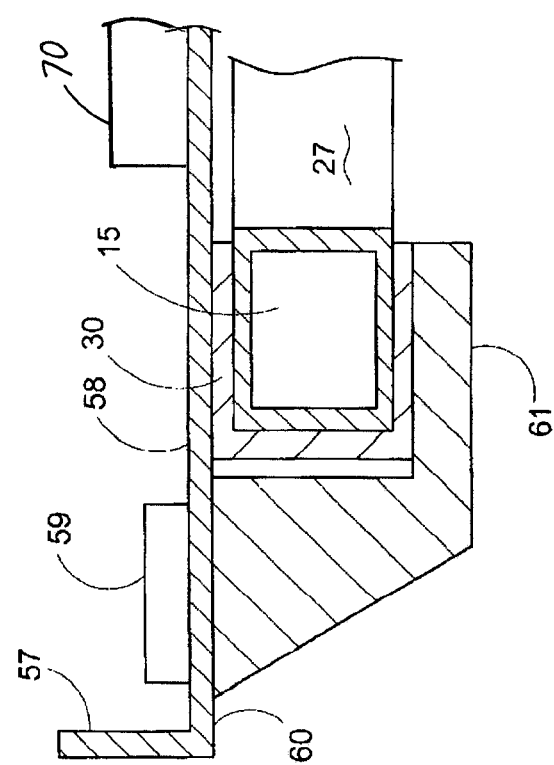

As seen in FIG. 2C, ramp assembly 8, includes opposed c-sections 61 to overfit and grab parallel rails 15, said opposed c-sections 61 are attached to the bottom 60 of ramp assembly 8 and form a 'c' shape around three sides of parallel rails 15. Wear plate 30 is between the parallel rails 15 and the insides of c-sections 61. C-sections 61 maintain alignment and position of ramp assembly 8 on rail assembly 9 when ramp assembly 8 slides on rail assembly 9. C-sections 61 extend substantially the entire length of parallel rails 15.

A support shelf 46 is affixed to and extends from frame support 20 about the center of the rear of the primary vehicle 1. The support shelf 46 includes the components to power the actuators of the carrier assembly 6. A hydraulic unit 36 is in communication with both actuators 16 as well as the ramp assembly 8 actuator 12, best seen in FIG. 2B. A power supply 38 supplies power to the hydraulic unit 36 when actuated by a control mechanism 40 for either deploying or retracting the two hydraulic pistons 16 which control the pivot, tilt or inclination of the rail assembly 9 and the ramp assembly 8. When the two hydraulic pistons 16 are not deployed the rail assembly 9 and the ramp assembly 8 are oriented in a generally horizontal position with respect to the ground. When both hydraulic pistons 16 are actuated, they push both the rail assembly 9 and the ramp assembly 8 upward about pivot 14 causing both assemblies 8 and 9 to be moved from a horizontal position to an angular position as shown. The angle formed is either zero when loading from a level the same as the carrier assembly 6, or in the range of 10-40 degrees with a preferred angle of about 20 degrees when loading the secondary vehicle from ground level. The power supply 38 also supplies power to the hydraulic unit 36 when actuated by a control mechanism (not shown) for deploying or retracting the single hydraulic piston (best seen in FIG. 2B).

Although hydraulic actuators and systems have been shown and discussed, other systems to move machine elements may also be employed. Pneumatic systems and systems employing electrical motors with power screws could also be utilized in other embodiments of the invention.

Referring specifically to FIG. 2B, a side view of the carrier assembly 6 with the rail assembly 9 and the ramp assembly 8 after they have been angularly rotated about pivot 14. This occurred due to the actuation and deployment of the pair of hydraulic actuators 16. This in turn also rotates the rear bumper 32 but not the rear stone sweep 34. As discussed earlier, the angular displacement of the ramp assembly 8 and the rail assembly 9 is in the range of 10-40 degrees with a preferred angle of about 20 degrees. This provides the most efficient angle to drive the secondary vehicle 4 onto the ramp assembly 8. As shown in FIG. 2B, the ramp assembly 8 has traveled a short distance from its non-deployed position. Hydraulic actuator 12, when activated, will compel the ramp assembly 8 to slide over parallel rails 15 of the rail assembly 9. Each of the parallel rails 15 is covered by a wear plate 30 to increase longevity of the both of the rails 15. Elements of the hydraulic system such as the power supply 38 are shown atop support shelf 46. FIG. 2B also shows some of the attachment mechanisms which secure the carrier assembly 6 to the primary vehicle 1 as well as support and stabilize the carrier assembly 6. A pair of parallel tubular beams 23 extend from the pair of first beam supports 20 attached to the underside of the primary vehicle 1. The pair of tubular beams 23 are then attached at their distal ends to an additional beam support 18 which extends from at least one support 23 to the other support beam 23 and to pivot 14. A U-shaped support assembly is formed by each one of the tubular beams 23 connected to one of the first pair of beam supports 20 and to the beam support 18. This U-shaped structure lies beneath the rail assembly 8. An additional support for structural coherence, integrity and vibration attenuation is provided by a turnbuckle strut 28 which is affixed to the lower support frame bracket 22 and to the distal end of support frame 18. A second turnbuckle strut which is not shown is similarly affixed to the lower support frame bracket on the other side of the primary vehicle 1. The structural frame 48 is where the pair of beam supports 20 are affixed to on the primary vehicle 1. This gives the carrier assembly 6 a solid mounting surface which would permit the primary vehicle 1 to drive at speed limits and over rough terrain while carrying the secondary vehicle 4. Other mounting arrangements of stabilizing elements as well as connection means to the undercarriage of the primary vehicle 1 are considered to be well with in within the scope of the invention.

Figure 3:
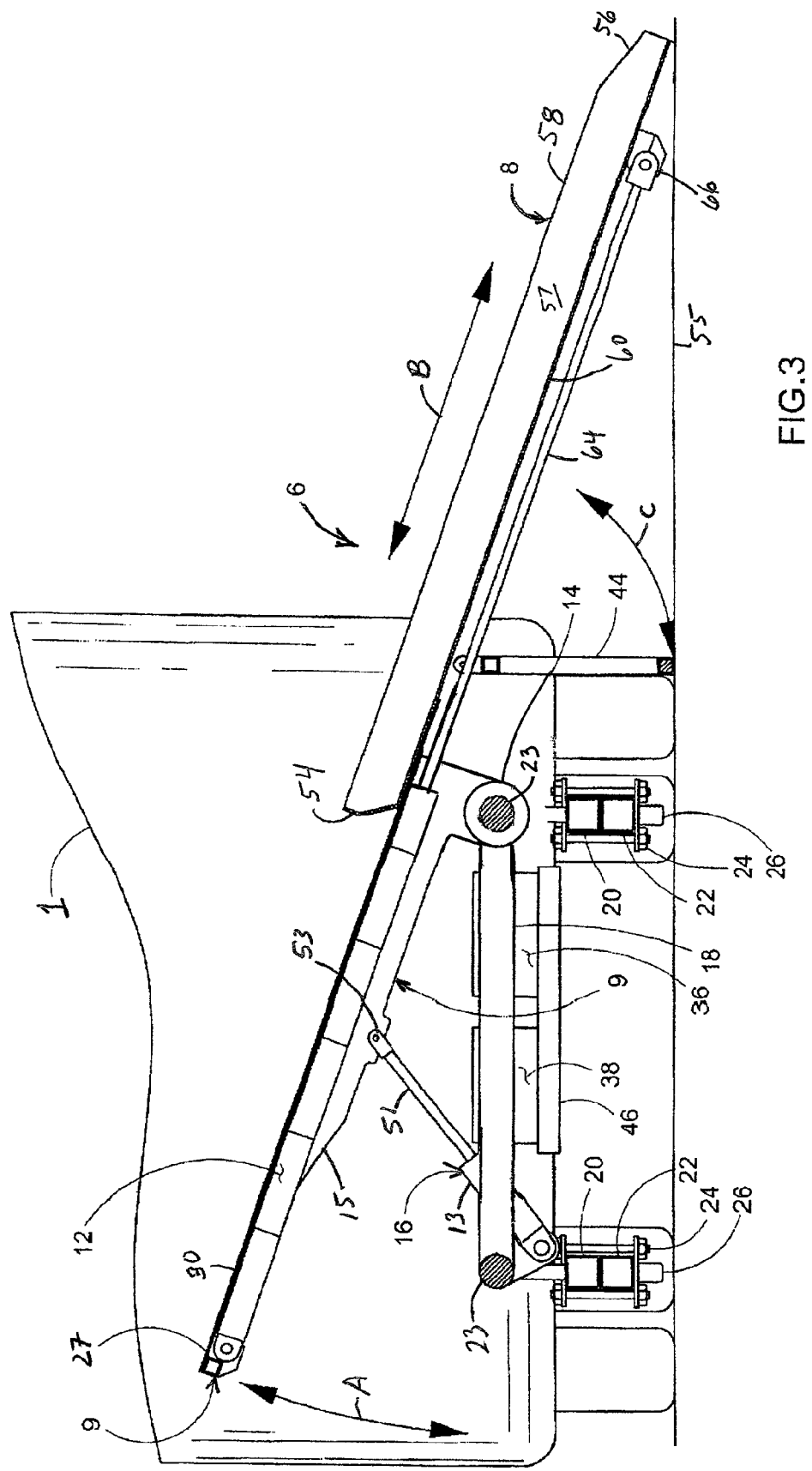
FIG. 3 is an end cutaway view of essential components of the carrier assembly in its pivoted position, as well as showing the ramp assembly in its extended state.

Referring specifically to FIG. 3, a cutaway view from the rear of the mounted carrier assembly 6, showing the one of the parallel rails 15 in its angularly disposed position. The actuation of the pair of hydraulic actuators 16 (only one shown in this figure) brings both the rail assembly 9 and the ramp assembly 8 to an angular displacement about a pivot 14 of between 10-40 degrees as indicated by arrows A. The ramp assembly 8 is slid down the rail assembly 9, on the parallel rails 15, the parallel rails 15 further having a wear plate 30 thereon to allow for a greater lifespan of the rail assembly 9. The ramp assembly 8 has a top side 58, a bottom side 60, a first end 54 and a second end 56 and opposed side walls 57 at the edges of ramp 8. A ramp hydraulic actuator 12 is affixed to the rail assembly 9 with its extensible-retractable piston 64 (direction of motion shown by arrows B) attached to the underside of the ramp assembly 8 at a securing block 66. In FIG. 3, the rail assembly 9 and the ramp assembly 8 are shown in their fully deployed positions. The pair of tubular beams 23 are shown connected by support beam 18. The pair of tubular beams 23 and the support beam 18 forms a C-shaped subassembly which is affixed to the structural frame 48 of the primary vehicle. The support shelf 46, hydraulic unit 36, for actuators 12 and both actuators 16, the power supply for all power requirements 38 such as for powering the hydraulic unit 38, the first beam supports 20, the lower support frame bracket 22, the attending securing hardware 24 and the skid wheel 26 have been previously discussed. A stabilizing support stand 44 to support the increased weight of the secondary vehicle while being driven up ramp 8 is pivotably attached to the underside of ramp 8 and may be rotated into its current position along arrows C. Another possible configuration for the carrier assembly 6 is where the pair of actuators 16 stay in their non-deployed position. This means the rail assembly 9 and the ramp assembly 8 are not tilted. In this case, just the ramp assembly may be deployed, keeping the ramp assembly 8 in a horizontal position. There are undoubtedly applications for this feature based on a loading height equivalent to the level of the ramp assembly.

The hydraulic actuators 16 each have a cylinder 13 and a rod 51 which hydraulically extends and retracts from cylinder 13 and the distal end of rod 51 is attached to rails 15 at pivot 53.

Figure 4:
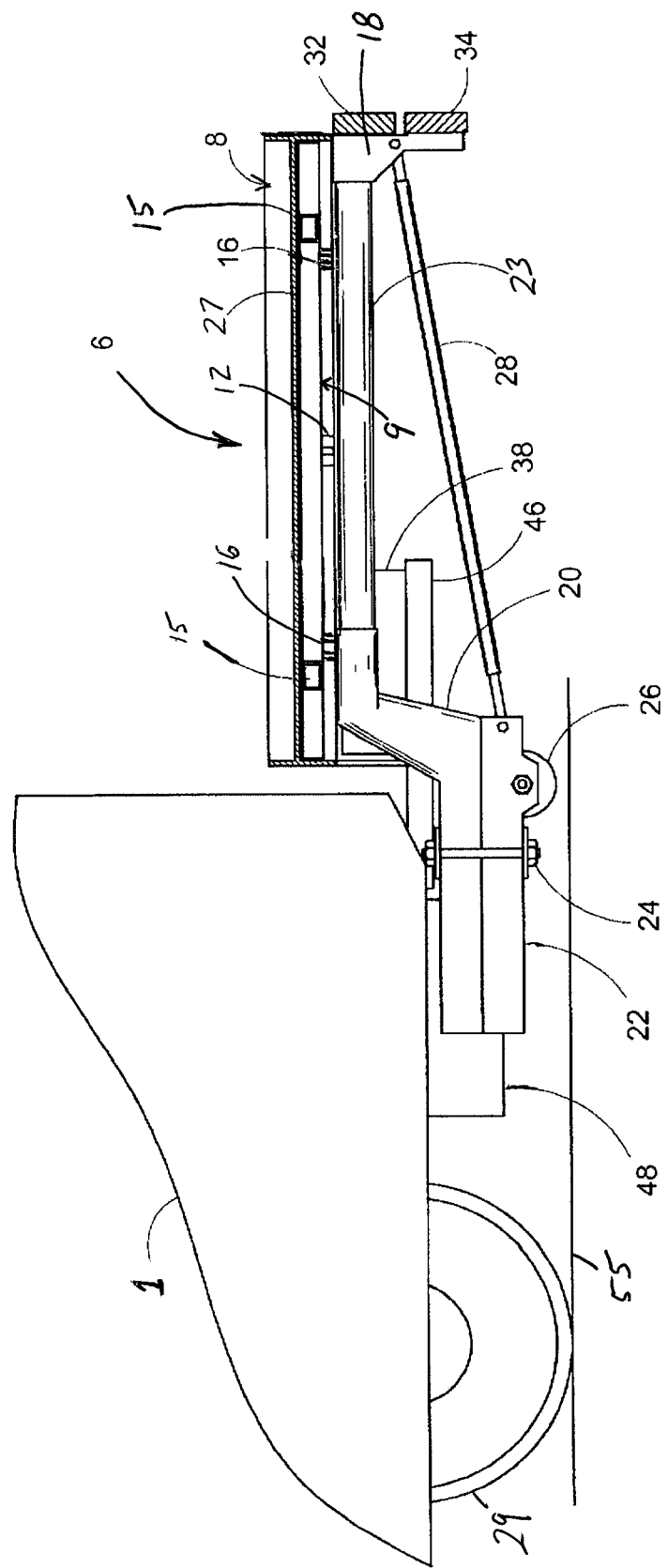
FIG. 4 is a view taken along line A-A of FIG. 2A, showing the carrier assembly in its retracted, loaded state, again sans secondary vehicle.

Referring specifically to FIG. 4 a cross sectional view taken along line A-A of FIG. 2A is shown. The support shelf 46, hydraulic unit 36, for actuators 12 and both actuators 16, the power supply for all power requirements 38 such as for powering the hydraulic unit 38, the first beam supports 20, the lower support frame bracket 22, the attending securing hardware 24 and the skid wheel 26 have been previously discussed. In FIG. 4, the rail assembly 9 and ramp assembly 8 are in their non-deployed positions. The pair of actuators 16 are attached to the pair of rails 15 in their fully retracted position, placing the rails 15 in a substantially horizontal position. The ramp actuator 16 is shown in its non-deployed position. Stabilizing arm 28 is added for additional stability for the carrier assembly 6. In this configuration, the carrier 6 could have a secondary vehicle 4 loaded aboard. The primary vehicle 1 can drive with or without the secondary vehicle 4 being present.

Referring specifically to FIGS. 5 through 8, the process of loading the carrier assembly 6 is shown in a sequential fashion.

FIG. 5 shows the primary vehicle 2 and the secondary vehicle 4. The overall carrier assembly 6 is in its fully deployed condition, the rail assembly 9 is shown in its deployed position, pivoted about pivot 14 due to the extension of the pair of hydraulic actuators 16.

Due to the extension of the ramp hydraulic actuator 12, the ramp assembly 8 is in its fully deployed position, still engaging the rail assembly 9 on the ramp first side 54 and placing the ramp second side 56 proximal the ground. Note how the ramp assembly 8 is transverse or perpendicular to the longitudinal axis of the primary vehicle 1. The overall angle of inclination of the ramp assembly 8 when both the rail assembly 9 and ramp assembly 8 are in deployed positions is approximately 20 degrees.

FIG. 6 shows the secondary vehicle 4 being driven on to the top side 58 of the ramp assembly 8. Chocks 59 are provided at the top end of ramp assembly 8 and blocks (not shown) may be provided about the other sides of the wheels 43 of the secondary vehicle 4 while on the ramp assembly 8 in order to limit movement of vehicle 4 once loaded onto ramp 8. Additionally, the secondary vehicle 4 would place its transmission in the PARK setting and would engage its organic parking brake. These actions are taken to enhance safety and prevent the secondary vehicle 4 from rolling off the ramp assembly 8.

FIG. 7 shows the ramp assembly 8 after being slid over the wear plate 30 on top of the parallel rails 15 of the rail assembly 9. This occurred because the ramp hydraulic actuator 12 was retracted due to instructions from a control mechanism 40.

FIG. 8 shows the carrier assembly 6, including both ramp assembly 8 and the rail assembly 9, with the secondary vehicle 4 in its home or non-deployed position. This occurs when the pair of hydraulic actuators 16 are retracted by a control mechanism. At this point the secondary vehicle 4 is secured fully to the top of the ramp assembly 58 about each of the tires 43 by four tie down elements (as shown in FIG. 1). The primary vehicle 1 now has the secondary vehicle 4 safely and securely loaded aboard the carrier assembly 6. The primary vehicle 1 may now safely proceed to any desired destination. Once the primary vehicle 1 has arrived, one need only reverse the process as discussed in FIGS. 5-8 in order to use the secondary vehicle. It is to be understood that the secondary vehicle 4 may back on to the ramp assembly 8 if so desired. Additionally, once the secondary vehicle 4 is on the ramp assembly 8, and the control mechanism 40 is engaged, it need not stop unless desired when the ramp assembly 8 is slid to its final location on the rail assembly 9. This could happen as a smooth series of movements culminating with the secondary vehicle 4 being loaded on the carrier assembly 6 or unloaded from the carrier assembly 6. The control mechanism may be simple, including loading commands, unloading commands, stop commands and an emergency stop command in case of the unexpected. The control mechanism is not limited to these commands in any way, some embodiments may exclude some commands or add other commands.

In use the secondary vehicle 4 would be loaded onto the carrier assembly 6 which is mounted on a primary vehicle 1 and the carrier assembly 6 having a rail assembly 9 with a slidably connected ramp assembly 8 by rotating the carrier assembly 6 having a rail assembly 9 and said slidably connected ramp assembly 8 in a direction perpendicular to the longitudinal axis of the primary vehicle 1 from a first horizontal position parallel to ground to an angle of about between 10-40 degrees; then sliding said slidably connected ramp assembly 8 from an original position over said rail assembly 8 until it comes in contact or in close proximity to a lower ground surface 55; driving or otherwise moving the secondary vehicle 4 up said ramp 8 which is currently angularly disposed; securing the vehicle 4 to said ramp 8 retracting the slidably connected ramp assembly 8 up said rail assembly 9 until it reaches said original position; rotating about said pivot 14 said rail assembly 9 and said slidably connected ramp assembly 8 from its angular position of about 10-40 degrees back to its horizontal position whereby the secondary vehicle 4 is loaded on said carrier assembly 6 and is connected to said primary vehicle 1.

It is to be understood that the preceding is merely a detailed description of the invention, and that alterations to the disclosed invention can be made in accordance with the disclosure without departing from the spirit and scope of the invention. The preceding description is not meant to limit the scope of the invention. The scope of the invention is to be determined by the appended claims and their equivalents.

I claim:

1. A carrier assembly mounted on the rear of a primary vehicle for both loading and carrying a secondary vehicle in a transverse position with respect to the primary vehicle comprising, a bed for supporting the secondary vehicle, mounted transversely to the length of the primary vehicle, a first beam and a second beam attached to the primary vehicle for supporting said bed, said bed having a first support and a second support, said first support having a non-deployed position and a deployed position, said second support further having a non-deployed position and a deployed position, said first support pivotally attached to said first beam to pivot from said non-deployed position upwardly to said first support deployed position, said second support slideably mounted on top of said first support to slide downwardly from said second support non-deployed position to said second support deployed position which is in close proximity to the secondary vehicle in order for the secondary vehicle to move onto said second support, whereby when the secondary vehicle is on said second support, said second support slideably returns to said second support non-deployed position carrying the secondary vehicle thereon, and said first support pivotally returns to said first non-deployed position, allowing said secondary vehicle to be transported in a transverse position with respect to said primary vehicle, wherein said first support includes two parallel rails, said two parallel rails including at least one stabilizing bar intermediate and perpendicular to said two parallel rails, a first movable actuator and a second movable actuator affixed first to a subassembly below said first support, and affixed second to each one of said parallel rails, whereby when said first movable actuator and said second movable actuator are actuated, said first support moves from a horizontal said non-deployed position upwardly to an angular said first support said deployed position.

2. A carrier assembly mounted on the rear of a primary vehicle as claimed in claim 1 wherein said second support assembly includes a ramp said ramp is adapted to overfit said each of said parallel rails, said ramp further having a top side and a bottom side, a third movable actuator connected to said one of said stabilizing bars and to said ramp bottom side, whereby when said third movable actuator is actuated said ramp slides along said parallel rails until said third movable actuator is substantially extended.

3. A carrier assembly mounted on the rear of a primary vehicle as claimed in claim 2 wherein said first movable actuator and said second movable actuator and said third movable actuator are movable actuators selected from the group consisting of hydraulic actuators, pneumatic actuators, and reversible electrical motors connected to power screws.

4. A carrier assembly mounted on the rear of a primary vehicle as claimed in claim 3 wherein when said first movable actuator and said second movable actuator are engaged, said parallel rails and said at least one stabilizing bar and said ramp pivotably rotates from zero degrees to a final position between 10 and 40 degrees from said non-deployed position and additionally when said third movable actuator is engaged, said ramp is slid downwardly along said parallel rails to a position proximal the ground, said ramp perpendicular to the primary vehicle, permitting the secondary vehicle to be moved on to said top of said ramp, said secondary vehicle being transverse to said primary vehicle.

5. A carrier assembly mounted on the rear of a primary vehicle as claimed in claim 4 wherein when said third actuator is retracted, said ramp is slidingly withdrawn along the angularly disposed said parallel rails with the secondary vehicle on said top of said ramp, said third actuator is retracted to its original position, and then further, said first actuator and said second actuator are retracted, pivotably rotating said parallel rails and said ramp to said horizontal position.

\* \* \* \* \*